US008894523B2

(12) United States Patent
Su

(10) Patent No.: US 8,894,523 B2
(45) Date of Patent: Nov. 25, 2014

(54) CHAINWHEEL FOR MULTI-SIZE CRANK MODULES

(71) Applicant: Chien-Yu Su, Taichung (TW)

(72) Inventor: Chien-Yu Su, Taichung (TW)

( * ) Notice: Subject to any disclaimer, the term of this patent is extended or adjusted under 35 U.S.C. 154(b) by 83 days.

(21) Appl. No.: 13/860,804

(22) Filed: Apr. 11, 2013

(65) Prior Publication Data
US 2014/0309066 A1 Oct. 16, 2014

(51) Int. Cl.
F16H 55/30 (2006.01)
(52) U.S. Cl.
CPC ...................................... F16H 55/30 (2013.01)
USPC ........................................................ 474/152
(58) Field of Classification Search
USPC ........................................................ 474/152
See application file for complete search history.

(56) References Cited

U.S. PATENT DOCUMENTS

| 580,291 | A | * | 4/1897 | Osmond | 74/594.2 |
| D35,192 | S | * | 10/1901 | Dodge | D12/123 |
| 5,722,735 | A | * | 3/1998 | Wright et al. | 301/37.372 |
| 2002/0086753 | A1 | * | 7/2002 | Yahata | 474/160 |
| 2004/0092352 | A1 | * | 5/2004 | Chiang | 474/160 |
| 2004/0110590 | A1 | * | 6/2004 | Renshaw | 474/152 |
| 2006/0172840 | A1 | * | 8/2006 | Kamada | 474/152 |
| 2007/0049436 | A1 | * | 3/2007 | Kamada | 474/152 |
| 2007/0049437 | A1 | * | 3/2007 | Wickliffe | 474/152 |
| 2007/0173364 | A1 | * | 7/2007 | Renshaw | 474/160 |
| 2008/0234084 | A1 | * | 9/2008 | Ackerman | 474/148 |
| 2011/0312457 | A1 | * | 12/2011 | Wang | 474/152 |
| 2013/0076106 | A1 | * | 3/2013 | Mooney et al. | 301/37.25 |
| 2013/0116074 | A1 | * | 5/2013 | Lin | 474/152 |
| 2013/0143704 | A1 | * | 6/2013 | Blank et al. | 474/161 |

* cited by examiner

Primary Examiner — Michael Mansen
Assistant Examiner — Henry Liu
(74) Attorney, Agent, or Firm — Jacobson Holman PLLC; Abraham Hershkovitz

(57) ABSTRACT

A chainwheel has a chainwheel body, a first combining hole set and a second combining hole set. The chainwheel body has a center point. The first combining hole set has multiple first combining holes that are formed through the chainwheel body. The first distances between the first combining holes and the center point are equal. The second combining hole set has multiple second combining holes that are formed through the chainwheel body. The second distances between the second combining holes and the center point are equal. The second distance is longer than the first distance. Therefore, the chainwheel can be combined with crank modules of different sizes by the first combining holes and the second combining holes.

6 Claims, 6 Drawing Sheets

CHAINWHEEL FOR MULTI-SIZE CRANK MODULES

BACKGROUND OF THE INVENTION

1. Field of the Invention

The present invention relates to a chainwheel, and more particularly to a chainwheel for multi-size crank modules.

2. Description of Related Art

A transmission system of a bike provides a power for moving the bike. The transmission system comprises a chainwheel, a crank module, a chain, and a rear sprocket. The crank module is combined with the chainwheel. The chainwheel is connected with the rear sprocket by the chain. In use, a user treads the crank module to rotate the chainwheel, and the rear sprocket is driven to rotate by the chain. Then, a rear wheel of the bike is driven to rotate by the rear sprocket, such that the bike can move forwards.

With reference to FIG. 5 and FIG. 6, a conventional chainwheel comprises a chainwheel body 70, multiple chain teeth 80, and five combining holes 90. The chainwheel body 70 is round and has a center point and a periphery. The chain teeth 80 are arranged along the periphery of the chainwheel body 70. The combining holes 90 are formed through the chainwheel body 70 and disposed equidistantly from one another. A hole distance R4 is defined between a center point of each combining hole 90 and the center point of the chainwheel body 70. The hole distances R4 between the center points of the combining holes 90 and the center point of the chainwheel body 70 are equal. A crank module C is combined with the chainwheel body 70 via the combining holes 90.

However, the conventional chainwheel can only be combined with the crank module of a single size. The manufacturer has to manufacture chainwheels of different sizes to fit the crank modules of different sizes. Therefore, the manufacture cost of the conventional chainwheels is increased.

SUMMARY OF THE INVENTION

The main objective of the present invention is to provide a chainwheel for multi-size crank modules to solve the aforementioned problem; the chainwheel comprises a chainwheel body, multiple chain teeth, a first combining hole set, and a second combining hole set.

The chainwheel body is round and comprises a center point and a periphery. The chain teeth are arranged along the periphery of the chainwheel body.

The first combining hole set comprises multiple first combining holes that are formed through the chainwheel body. Each first combining hole has a center point. A first distance is defined between the center point of each first combining hole and the center point of the chainwheel body. The first distances between the center points of the first combining holes and the center point of the chainwheel body are equal.

The second combining hole set comprises multiple second combining holes that are formed through the chainwheel body. Each second combining hole has a center point. A second distance is defined between the center point of each second combining hole and the center point of the chainwheel body. The second distances between the center points of the second combining holes and the center point of the chainwheel body are equal. The second distance is longer than the first distance.

Therefore, two crank modules of two different sizes can be combined to the first combining holes and the second combining holes, such that the chainwheel can be combined with the crank modules of different sizes, eliminating the need for manufacturing chainwheels of different sizes. The manufacturing cost of the chainwheel can be reduced effectively.

DETAILED DESCRIPTION OF PREFERRED EMBODIMENT

Figure 1:
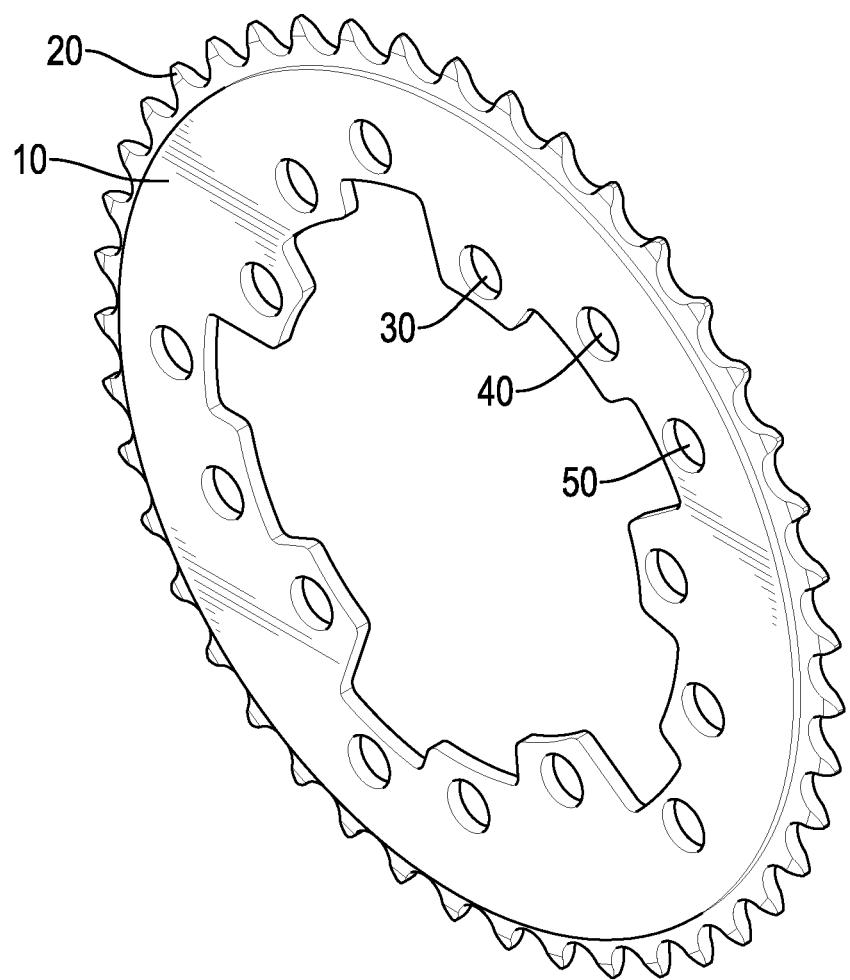
FIG. 1 is a perspective view of a preferred embodiment of a chainwheel in accordance with the present invention.
Figure 2:
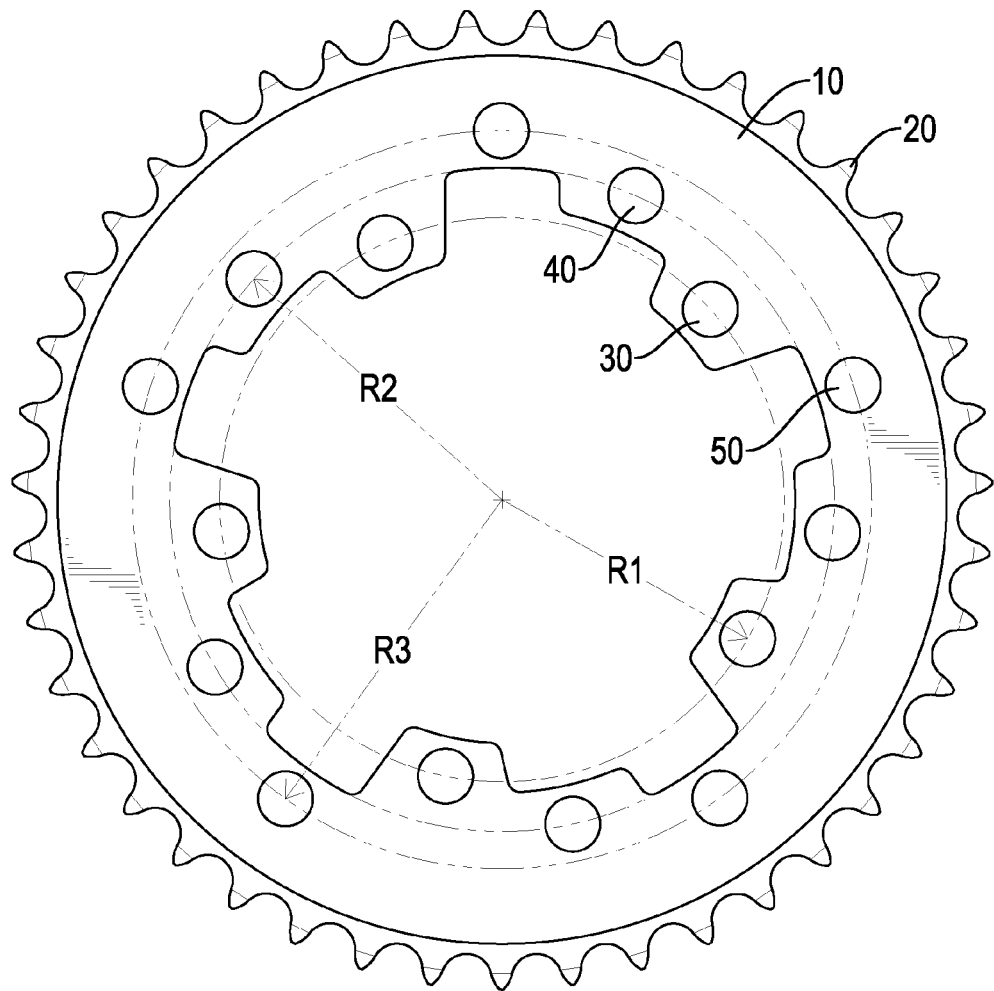
FIG. 2 is a front view of the chainwheel in FIG. 1.

With reference to FIG. 1 and FIG. 2, a preferred embodiment of a chainwheel in accordance with the present invention comprises a chainwheel body 10, multiple chain teeth 20, a first combining hole set 30, a second combining hole set 40, and a third combining hole set 50.

The chainwheel body 10 is round and has a center point and a periphery. The chain teeth 20 are arranged along the periphery of the chainwheel body 10. The first combining hole set 30 is formed through the chainwheel body 10 and comprises multiple first combining holes that are formed through the chainwheel body 10. A first distance R1 is defined between a center point of each first combining hole and the center point of the chainwheel body. The first combining holes are disposed equidistantly from one another.

The second combining hole set 40 is formed through the chainwheel body 10 and comprises multiple second combining holes that are formed through the chainwheel body 10. A second distance R2 is defined between a center point of each second combining hole and the center point of the chainwheel body 10, and the second distance R2 is longer than the first distance R1. The second combining holes are disposed equidistantly from one another.

The third combining hole set 50 is formed through the chainwheel body 10 and comprises multiple third combining holes that are formed through the chainwheel body 10. A third distance R3 is defined between a center point of each third combining hole and the center point of the chainwheel body 10, and the third distance R3 is longer than the second distance R2. The third combining holes are disposed equidistantly from one another.

In use, the chainwheel can be connected with a crank module by the first combining hole set 30, the second combining hole set 40 or the third combining hole set 50. The crank module can transfer the force applied by the user to the chainwheel, and then the chainwheel transfers the force to a rear wheel of a bike.

To evenly transfer the force applied from the user by the crank module, the combining holes are formed through the chainwheel body 10 equidistantly from one another. The amount of the first combining holes may be three, four, or five. The amount of the second combining holes and the amount of the third combining holes also may be three, four, or five. Preferably, the amount of the first combining holes, the amount of the second combining holes, and the amount of the third combining holes are five respectively.

The first combining holes, the second combining holes and the third combining holes may be disposed alternately or non-alternately with each other. The third combining hole set 50 may be omitted, as long as the chainwheel has two combining hole sets to be connected with different crank modules of different sizes.

Figure 3:
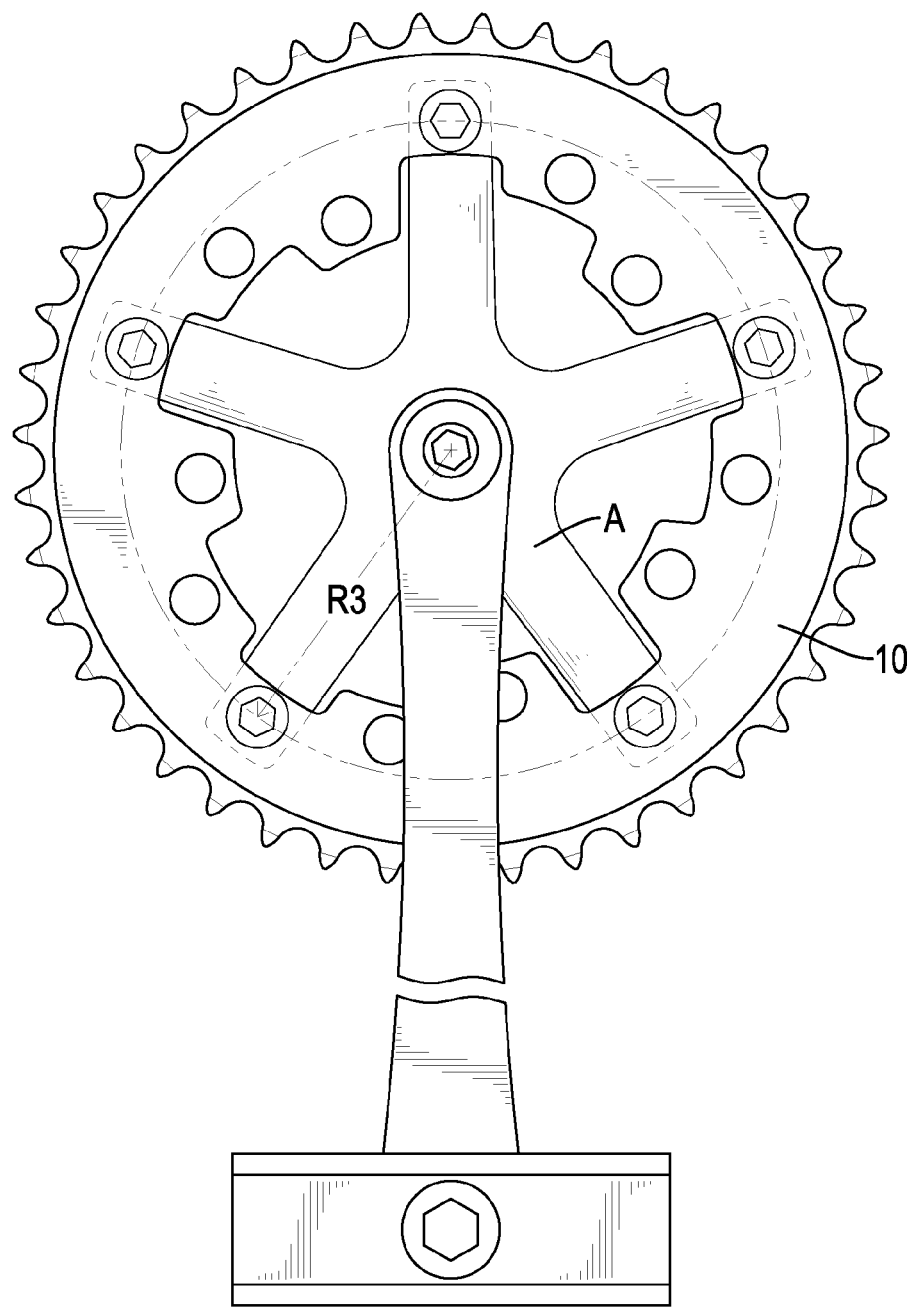
FIG. 3 is an operational front view of the chainwheel in FIG. 1.
Figure 4:
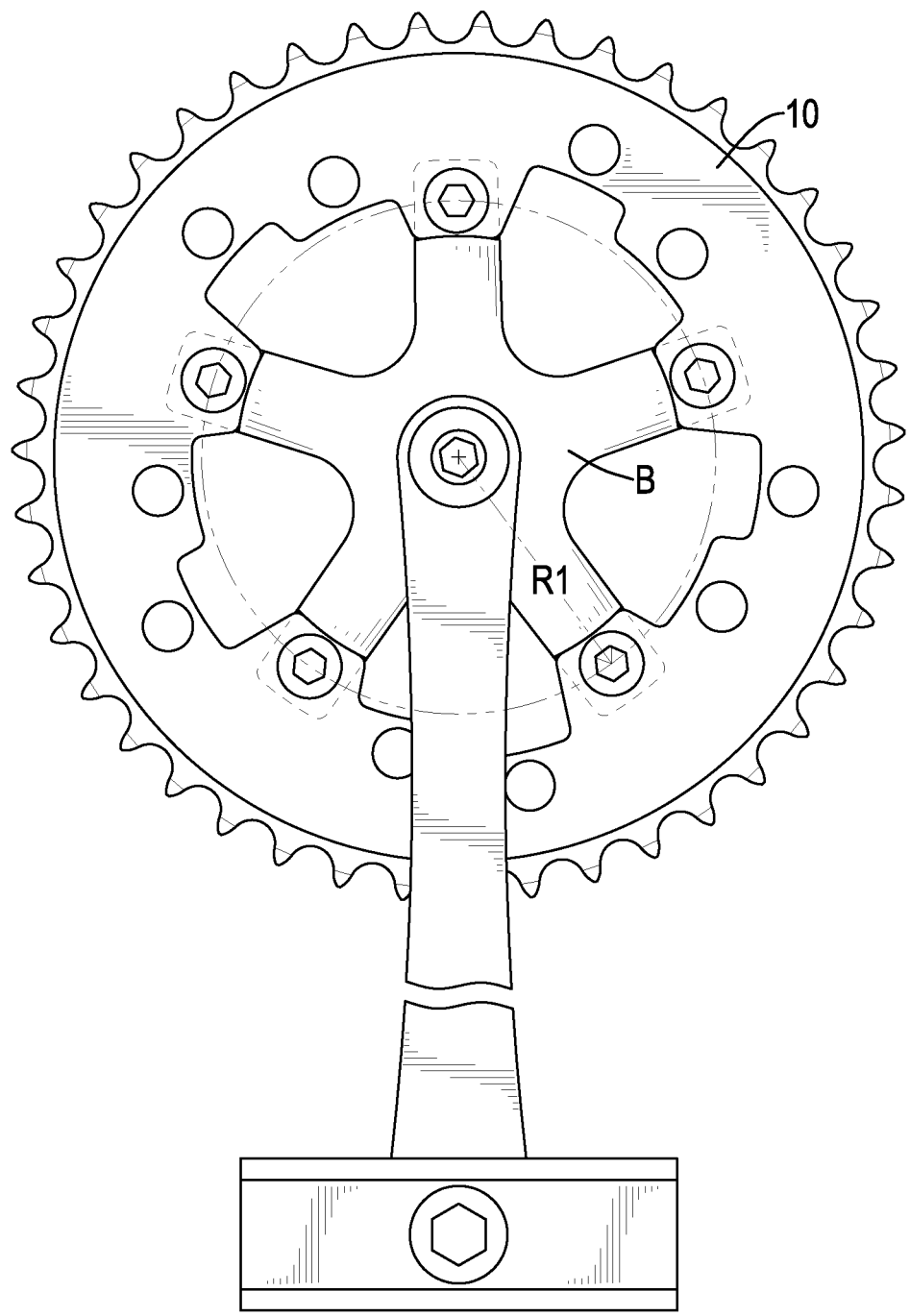
FIG. 4 is another operational front view of the chainwheel in FIG. 1.
Figure 5:
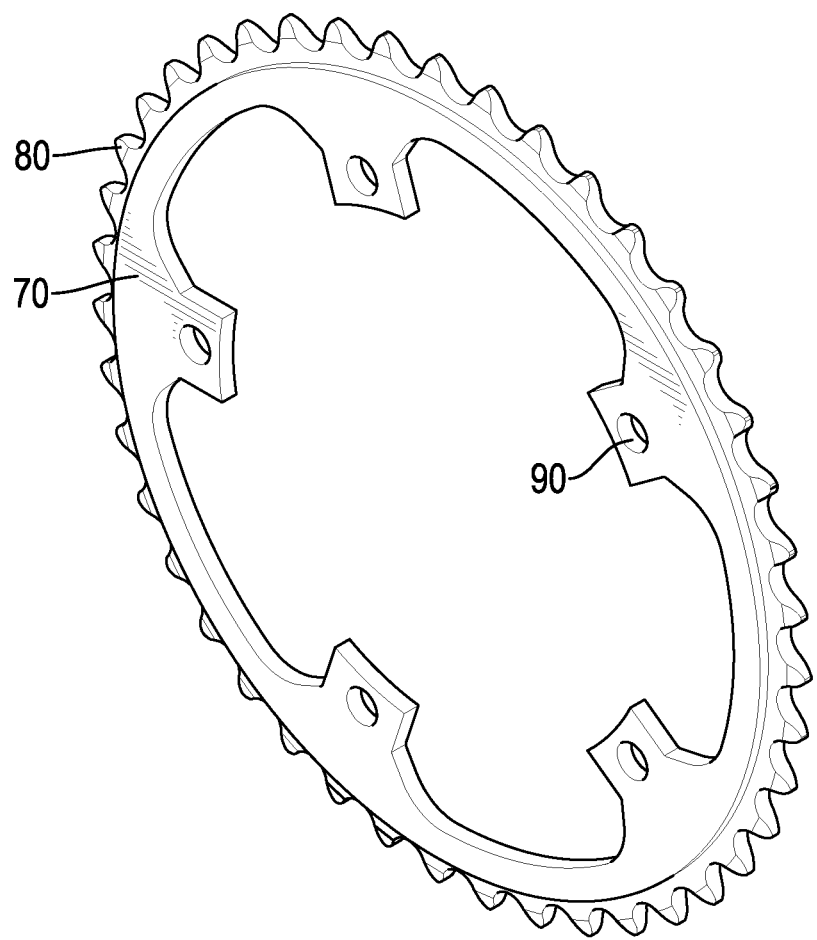
FIG. 5 is a perspective view of a conventional chainwheel.
Figure 6:
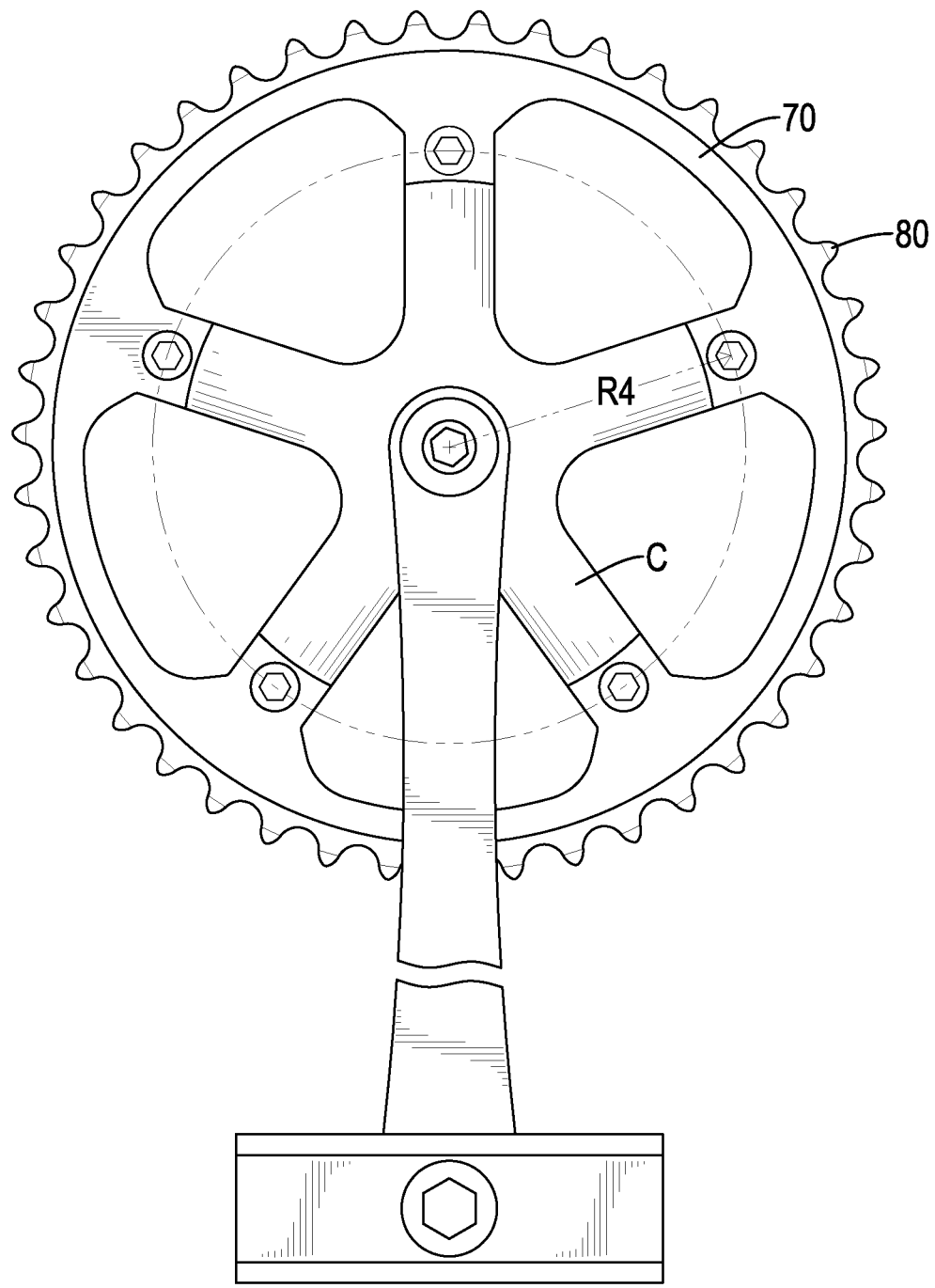
FIG. 6 is an operational front view of the conventional chainwheel in FIG. 5.

With reference to FIG. 2 and FIG. 3, the chainwheel is connected with a crank module A whose size matches the third combining hole set 50. With reference to FIG. 2 and FIG. 4, the chainwheel is connected with a crank module B whose size matches the first combining hole set 30. The chainwheel can be connected with different crank modules of different sizes by the first combining hole set 30, the second combining hole set 40 and the third combining hole set 50 without the need for manufacturing chainwheels of different sizes. Therefore, the manufacturing cost of the chainwheel can be reduced effectively.

What is claimed is:

1. A chainwheel comprising:
   a chainwheel body being round and comprising
      a center point; and
      a periphery;
   multiple chain teeth arranged along the periphery of the chainwheel body;
   a first combining hole set formed through the chainwheel body and comprising multiple first combining holes that are formed through the chainwheel body, wherein
      each first combining hole has a center point;
      a first distance is defined between the center point of each first combining hole and the center point of the chainwheel body; and
      the first distances between the center points of the first combining holes and the center point of the chainwheel body are equal; and
   a second combining hole set formed through the chainwheel body and comprising multiple second combining holes that are formed through the chainwheel body, wherein
      each second combining hole has a center point;
      a second distance is defined between the center point of each second combining hole and the center point of the chainwheel body;
      the second distances between the center points of the second combining holes and the center point of the chainwheel body are equal; and
      the second distance is longer than the first distance.

2. The chainwheel as claimed in claim 1, wherein the first combining holes and the second combining holes are alternately disposed with each other.

3. The chainwheel as claimed in claim 1 further comprising a third combining hole set formed through the chainwheel body and comprising multiple third combining holes that are formed through the chainwheel body, wherein
   each third combining hole has a center point; and
   a third distance is defined between the center point of each third combining hole and the center point of the chainwheel body, wherein the third distances between the center points of the third combining holes and the center point of the chainwheel body are equal, wherein the third distance is longer than the second distance.

4. The chainwheel as claimed in claim 2 further comprising a third combining hole set formed through the chainwheel body and comprising multiple third combining holes that are formed through the chainwheel body, wherein
   each third combining hole has a center point; and
   a third distance is defined between the center point of each third combining hole and the center point of the chainwheel body, wherein the third distances between the center points of the third combining holes and the center point of the chainwheel body are equal, wherein the third distance is longer than the second distance.

5. The chainwheel as claimed in claim 3, wherein the third combining holes, the second combining holes, and the first combining holes are alternately disposed with one another.

6. The chainwheel as claimed in claim 4, wherein the third combining holes, the second combining holes, and the first combining holes are alternately disposed with one another.

* * * * *